(12) United States Patent
Adervall et al.

(10) Patent No.: US 9,823,551 B2
(45) Date of Patent: Nov. 21, 2017

(54) MOUNTING BRACKET FOR MOUNTING A MONITORING CAMERA

(71) Applicant: Axis AB, Lund (SE)

(72) Inventors: Mikael Adervall, Klagshamn (SE); Louise Wiberg, Malmo (SE); Andres Vigren, Hollviken (SE); Mats-Ake Ekbladh, Bjarred (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/374,642

(22) Filed: Dec. 9, 2016

(65) Prior Publication Data
US 2017/0168376 A1 Jun. 15, 2017

(30) Foreign Application Priority Data

Dec. 10, 2015 (EP) .................................. 15199293

(51) Int. Cl.
| | | |
|---|---|---|
| *G03B 17/56* | (2006.01) | |
| *H04N 5/225* | (2006.01) | |
| *H04N 7/18* | (2006.01) | |

(52) U.S. Cl.
CPC .......... *G03B 17/561* (2013.01); *H04N 5/2252* (2013.01); *H04N 5/2253* (2013.01); *H04N 7/183* (2013.01)

(58) Field of Classification Search
CPC .. G03B 17/561; H04N 5/2252; H04N 5/2253; H04N 5/7183
USPC ............................ 396/419–428; 348/373–376
See application file for complete search history.

(56) References Cited

U.S. PATENT DOCUMENTS

| | | |
|---|---|---|
| 1,219,596 A | 3/1917 | Simmons |
| 4,709,897 A | 12/1987 | Mooney |
| 6,015,123 A | 1/2000 | Perez et al. |
| 8,398,316 B2 | 3/2013 | Mota et al. |
| (Continued) | | |

FOREIGN PATENT DOCUMENTS

| | | |
|---|---|---|
| CN | 201706162 U | 1/2011 |
| GB | 2384520 A | 7/2003 |
| (Continued) | | |

OTHER PUBLICATIONS

"2Gig Image1 Image Sensor," 2Gig, <http://2gig.com/docs/qr/image1/index.php>, retrieved Dec. 9, 2016.
(Continued)

*Primary Examiner* — Rochelle-Ann J Blackman
(74) *Attorney, Agent, or Firm* — Snyder, Clark, Lesch & Chung, LLP

(57) ABSTRACT

The disclosure relates to a mounting bracket for mounting a monitoring camera. The bracket comprises an alcove adapted to slidingly receive said camera, a first mounting arrangement adapted for the camera to be mounted in a corner formed of a first and second wall, the first mounting arrangement comprising a first and second mounting surface arranged at an angle relative to each other. The first mounting surface is adapted to be attached to and abut the first wall. The second mounting surface is adapted to be attached to and abut the second wall. A second mounting arrangement is adapted for the camera to be mounted on a wall, the second mounting arrangement comprising a third mounting surface adapted to be attached to and abut the wall. The disclosure also relates to a system with a mounting bracket and monitoring camera.

35 Claims, 7 Drawing Sheets

(56) References Cited

U.S. PATENT DOCUMENTS

| | | | |
|---|---|---|---|
| 2002/0108230 | A1 | 8/2002 | Soloway et al. |
| 2003/0029975 | A1 | 2/2003 | Cowan et al. |
| 2006/0071141 | A1 | 4/2006 | Kang |
| 2006/0237603 | A1 | 10/2006 | Shi |

FOREIGN PATENT DOCUMENTS

| | | | |
|---|---|---|---|
| JP | 2001238101 | A | 8/2001 |
| WO | 9944472 | A1 | 9/1999 |
| WO | 03077530 | A2 | 9/2003 |

OTHER PUBLICATIONS

Extended European Search Report issued in corresponding European Application No. 15199293.0, dated Jun. 3, 2016, 8 pages.

MOUNTING BRACKET FOR MOUNTING A MONITORING CAMERA

RELATED APPLICATION

This application claims priority to European Application No. 15199293.0 filed Dec. 10, 2015, which is incorporated by reference herein.

FIELD OF INVENTION

The inventions relates to a mounting bracket for mounting a monitoring camera. The invention also relates to a system comprising a mounting bracket and a monitoring camera.

TECHNICAL BACKGROUND

A monitoring camera is typically mounted in a ceiling or close to the ceiling on a wall or in a corner formed of two walls. This position is typically useful to be able to provide an undisturbed view for monitoring purposes.

When designing the mounting system for the mounting of a monitoring camera, the designer needs to take a number of different aspects into account. The designer needs, e.g., to consider that it should be easy for the installer to install the camera on the wall at the desired location; the mounting system should be capable of keeping the camera securely in place; the mounting system should be easy and cost-effective to manufacture.

U.S. Pat. No. 6,015,123 discloses a mounting system for mounting a camera base to a variety of different support structures. The mounting system comprises an elaborately designed mounting bracket which may be attached to a wall or a corner. The mounting system further comprises a camera base which is adapted to be attached to the mounting bracket. The camera base in turn is adapted to support a camera.

U.S. Pat. No. 8,398,316 discloses a bracket for mounting a security camera onto a door, a window frame, a fence or any other device or element having a top edge and two side edges extending therefrom.

U.S. Pat. No. 4,709,897 discloses a surveillance camera mount. The mount comprises a bracket and a base defining a hollow housing, which are formed so as to render the mount essentially tamper-proof.

In another technical area, related to mounting of movement detectors, it is known to attach the movement detector to a wall or in a corner. In such a design the installer first disassembles the movement detector by removing the front cover followed by the removal of the circuit board thereby exposing the back cover. The back cover is attached to the wall and then the movement detector is reassembled by the installer by reinstallment of the circuit board, installment of a battery, followed by reattachment of the front cover.

SUMMARY OF INVENTION

It is an object of the invention to provide a useful solution to the problem of mounting a monitoring camera.

This object has been achieved by a mounting bracket for mounting a monitoring camera. The mounting bracket comprises an alcove or pocket adapted to slidingly receive said monitoring camera, a first mounting arrangement adapted to be used if the monitoring camera is intended to be mounted in a corner formed of a first and a second wall, the first mounting arrangement comprising a first and a second mounting surface arranged at an angle relative to each other, wherein the first mounting surface is adapted to be attached to and to abut the first wall and wherein the second mounting surface is adapted to be attached to and to abut the second wall, and a second mounting arrangement adapted to be used if said monitoring camera is intended to be mounted on a wall, the second mounting arrangement comprising a third mounting surface adapted to be attached to and to abut the wall.

This way, it is easy to install the monitoring camera selectively on a wall or corner formed of a first and a second wall. The installer simply attaches the mounting bracket, e.g., by screwing a screw through the first surface into the first wall and/or by screwing a screw through the second surface into the second wall. Thereafter the installer simply slides the monitoring camera into place in the alcove of the mounting bracket.

When the monitoring camera is intended to be installed on a wall, the installer simply attaches the mounting bracket, e.g., by screwing a screw through the third surface into the wall. Thereafter the installer simply slides the monitoring camera into place in the alcove of the mounting bracket.

Thus, the design of the mounting bracket makes it simple for the installer to install the monitoring camera, both for mounting on a wall and for mounting in a corner.

It may be noted that the use of screws for attaching the mounting bracket is an example. There are other means of attaching the mounting bracket to the wall or walls.

The mounting bracket may according to one alternative be attached using an adhesive, such as an adhesive tape. The tape may be provided between the first surface and the first wall and/or between the second surface and the second wall when the mounting bracket is installed in a corner. The tape may be provided between the third surface and the wall when the mounting bracket is installed on a wall.

Strips of adhesive tape may, e.g., be pre-adhered to the surfaces of the mounting bracket and may during transport be protected with a protective non-adhesive strip. At the installation site, the installer simply removes the protective strips on the surfaces intended to be attached to the walls thereby exposing the adhesive tape on the intended surfaces. The mounting bracket is then pushed into place on the wall or in the corner such that the exposed adhesive strips attach to the wall or walls.

The monitoring camera may be slid into place in the alcove using, to a large extent, a horizontally directed movement. Thereby it is possible to place the monitoring camera close to the ceiling. It is also beneficial to design the interaction between the camera and the mounting bracket as an alcove since this provides the possibility to provide an open mounting bracket, thereby allowing ventilating air flow for cooling of the electronic circuitry of the camera.

Each of the first mounting surface and the second mounting surface may extend at an angle relative to the third mounting surface in a direction intended to extend away from the wall or corner such that, when the mounting bracket is mounted in a corner, the first wall, the second wall and the third mounting surface define a prismatic volume with triangular cross-section (as viewed from above). This design is preferred since two different mounting modes or corner) are simply provided with three surfaces which are easy to design as a part of a shell. The first and second surfaces extend along two planes which intersect at an angle of preferably about 90°.

The first mounting surface may extend along a first side of the third mounting surface and the second mounting surface extends along a second side, opposite the first side, of the third mounting surface. This provides a compact and strong design.

The alcove comprises a fourth surface and a fifth surface, the fourth and fifth surfaces forming two opposing, inwardly facing side surfaces, each extending from a respective one of the first and second mounting surfaces and at an angle relative to the third mounting surface in a direction intended to extend away from the wall or the corner, wherein the two side surfaces of the alcove are adapted to slidingly engage with two opposing, outwardly facing side surfaces of the monitoring camera. This way it is easy to design the mounting bracket as a shell with the surfaces arranged one after another forming the shell in the order; the fourth surface, the first surface, the third surface, the second surface and the fifth surface. It may be noted that the term surfaces has been used to refer to the surface actually being active or having a function. When it comes to the abutment to the walls, it is the surface on the outside or backside of the different portions of the mounting bracket that abuts the walls. When it comes to the fourth and fifth surfaces of the alcove, it is the inside surfaces of those portions that abut the camera.

When the bracket is mounted on the wall or in the corner, the fourth and fifth surfaces may be adapted to each extend in a respective plane having a vertical extension, and wherein the fourth and fifth surfaces may be parallel to each other. Thereby the design allows said monitoring camera to be inserted between the fourth and fifth surfaces in a horizontally directed movement. It should be noted that the fourth and fifth surfaces need not be strictly parallel to each other. In one alternative their respective free ends are slightly inclined towards each other and they are in such a case preferably resiliently flexible, thereby allowing said monitoring camera to be inserted between the fourth and fifth surfaces in a horizontally directed movement, and the resilience is used to securely hold the camera in place in the alcove. It should also be noted that the planes have a vertical extension, but that the free ends of the surfaces need not be vertically extending. In some embodiments, such as, e.g. the one disclosed in the drawings, the free ends of the surfaces are inclined such that the free ends face away from the wall and downwardly. Since the fourth and fifth surfaces allow for the camera to be inserted into the alcove in a horizontally directed movement, it is possible to mount the camera close to the ceiling.

The fourth and fifth surfaces may each be provided with an upper tongue adapted to extend, when the bracket is mounted on the wall or in the corner, upwardly from the fourth and the fifth surface, respectively, and to be inserted into and interact with one to each upper tongue associated downwardly facing upper recess of said monitoring camera, the interaction between the upper tongues and upper recesses being adapted to prevent said monitoring camera from being removed from between the fourth and fifth surfaces in a horizontally directed movement. By providing the mounting bracket with such upwardly extending upper tongues the camera may be held in place using only gravity. The provision of such a tongue also provides the possibility to ensure a secure positioning of the camera in the alcove and still allowing the camera to be inserted to a large extent along a horizontal direction. The only vertical movement necessary is the short distance for allowing the upper upwardly extending tongues to pass the portions of the camera surrounding the recess such that the tongue becomes aligned with the recesses of the camera.

The bracket may further be provided with at least one lower tongue which is positioned at a bottom portion of the alcove and which is adapted to extend, when the bracket is mounted on the wall or in the corner, upwardly from the bottom portion and to be inserted into and interact with one to each at least one lower tongue associated downwardly facing lower recess of said monitoring camera, the interaction between the lower tongue and the lower recess being adapted to prevent said monitoring camera from being removed from between the fourth and fifth surfaces in a horizontally directed movement. By providing the mounting bracket with such an upwardly extending lower tongue the camera may be held in place using only gravity. The provision of such a tongue also provides the possibility to provide a secure positioning of the camera in the alcove and still allowing the camera to be inserted to a large extent along a horizontal direction. The only vertical movement necessary is the short distance for allowing the lower upwardly extending tongue to pass the portions of the camera surrounding the recess such that the tongue becomes aligned with the recesses of the camera.

The lower tongue may have a main extension along a first direction and may be provided with a protrusion having an extension in a to the first direction transverse direction, and wherein the lower tongue is resiliently flexible in the transverse direction, thereby capable of providing a snap-lock action with a transversely oriented edge in the lower recess of said monitoring camera, preventing the monitoring camera from being moved vertically upwardly from the alcove. This way the camera is held securely in place in the alcove. Moreover, the snap-lock may provide the installer with feedback concerning that the camera is correctly positioned in the alcove.

The bracket may further comprise a bottom wall adjoining the third surface, the first and second surfaces and the fourth and fifth surfaces. This provides a significant strengthening and shape stability to the bracket.

The bottom wall may be provided with a through-going opening. This opening may be used for cables and for providing ventilation.

A first wall member forming the first surface and a second wall member forming the second surface may each be provided with one or more through-going openings, wherein when the bracket is intended to be mounted in a corner, one or more fasteners are adapted to extend through said one or more through-going openings in the first wall member to attach the bracket with the first surface in abutment to the first wall and one or more fasteners are adapted to extend through said one or more through-going openings in the second wall member to attach the bracket with the second surface in abutment to the second wall. This provides a simple design of the bracket and a simple installation process for the installer. The openings may be circular and the fasteners, such as a screw, may be inserted through the openings as the bracket is held in place on the wall. The openings may be designed such that the fasteners are held in place by the walls of the opening such that the installer only needs to hold the bracket. In the preferred embodiment the openings are key-hole shaped with a lower large portion being larger than the head of the fastener and an upper narrower portion being smaller than the head of the fastener. Thereby the installer may attach the fasteners to the wall and thereafter put the bracket in correct position by attaching it to the already attached fasteners.

A third wall member forming the third surface may be provided with one or more through-going openings, wherein when the bracket is intended to be mounted on a wall, one or more fasteners are adapted to extend through said one or more through-going openings to attach the bracket with the third surface in abutment to the wall. This provides a simple design of the bracket and a simple installation process for the installer. The openings may be circular and the fasteners, such as a screw, may be inserted through the openings as the bracket is held in place on the wall. The openings may be designed such that the fasteners are held in place by the walls of the opening such that the installer only needs to hold the bracket. In the preferred embodiment the openings are key-hole shaped with a lower large portion being larger than the head of the fastener and an upper narrower portion being smaller than the head of the fastener. Thereby the installer may attach the fasteners to the wall and thereafter put the bracket in correct position by attaching it to the already attached fasteners.

A fourth wall member forming the fourth surface and/or a fifth wall member forming the fifth surface may comprise one or more resiliently depressible portions adapted to interact with one or more associated depressible button on said monitoring camera, thereby allowing said one or more buttons to be operated although hidden inside the alcove of the mounting bracket. This way it is easy to design the camera and walls of the alcove to provide the sliding function and still facilitate for the installer or user of the camera to manoeuvre the camera, without having to remove the camera from the bracket.

The alcove may be adapted to receive a monitoring camera in a fixed mounting position, and the first and second mounting arrangement may be inclined relative to the alcove such that there is provided a fixed mounting angle ($\beta$) in relation to the wall or the corner wherein the camera is adapted to in said mounting position be inclined relative to the wall or corner with its field of view oriented away from the wall or corner and inclined downwardly. The fixed mounting angle in relation to the wall makes it possible to ensure that the camera is mounted with the upper limit of the vertical view angle ($\alpha$) parallel to the ceiling. Thereby, it is easy to ensure that the camera does not get blinded by light from lamps in the ceiling. The fixed mounting angle is adapted to the vertical angle of the field of view of the camera intended to be installed in the mounting bracket. Thus, the mounting angle should be adapted to the intended optics.

The above mentioned object has also been achieved by a system comprising a mounting bracket and a monitoring camera with an outer envelope being adapted to be slidingly received in the alcove of the mounting bracket.

BRIEF DESCRIPTION OF THE DRAWINGS

The invention will by way of example be described in more detail with reference to the appended schematic drawings, which show a presently preferred embodiment of the invention.

FIG. 5b is a top perspective view of the camera and mounting bracket of FIG. 5a.

FIG. 6b is a perspective view of the camera and mounting bracket of FIG. 6a.

DETAILED DESCRIPTION OF PREFERRED EMBODIMENTS

Figure 1:
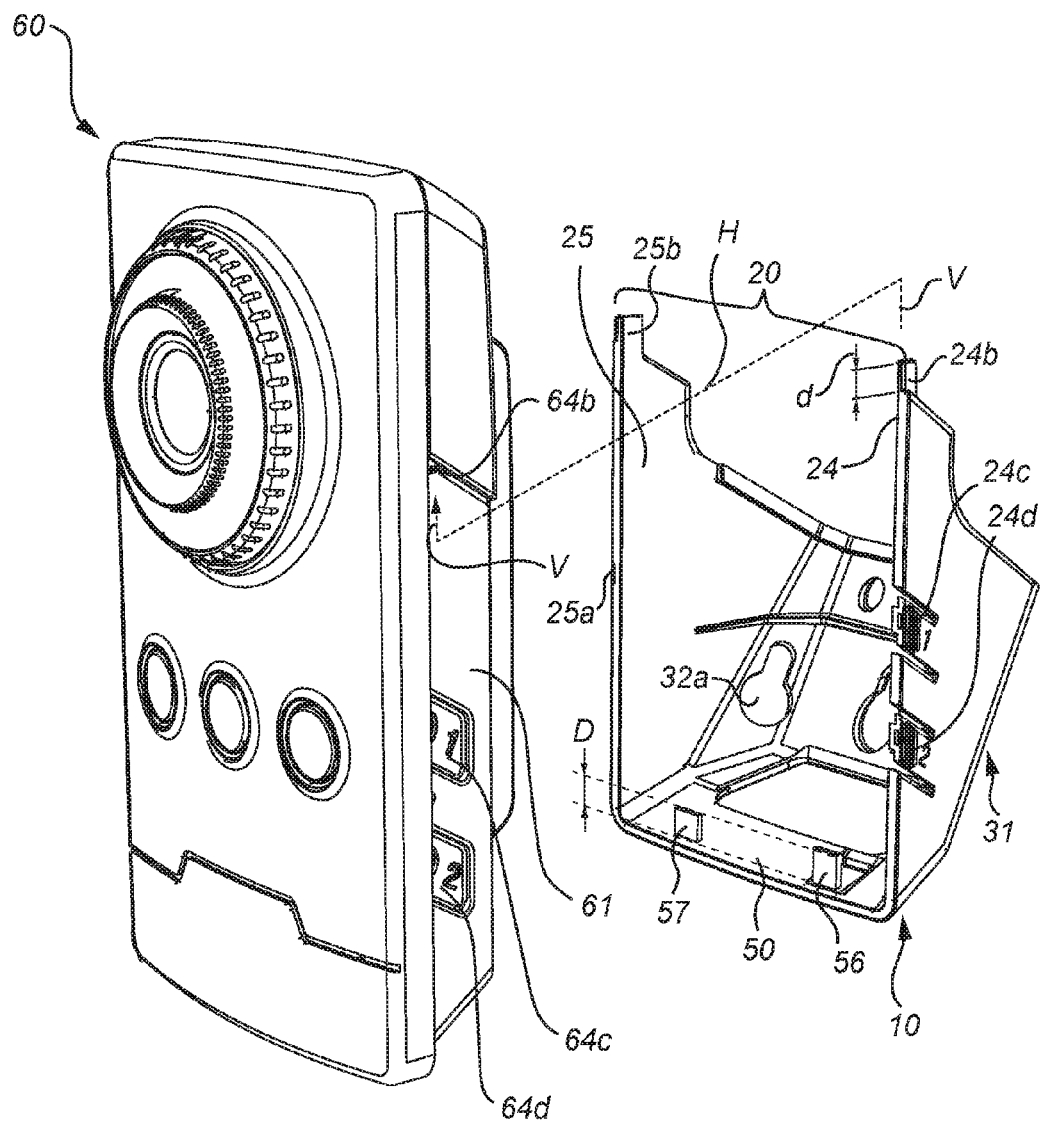
FIG. 1 is a front perspective view of a camera and a mounting bracket in a non-assembled state.
Figure 5A:
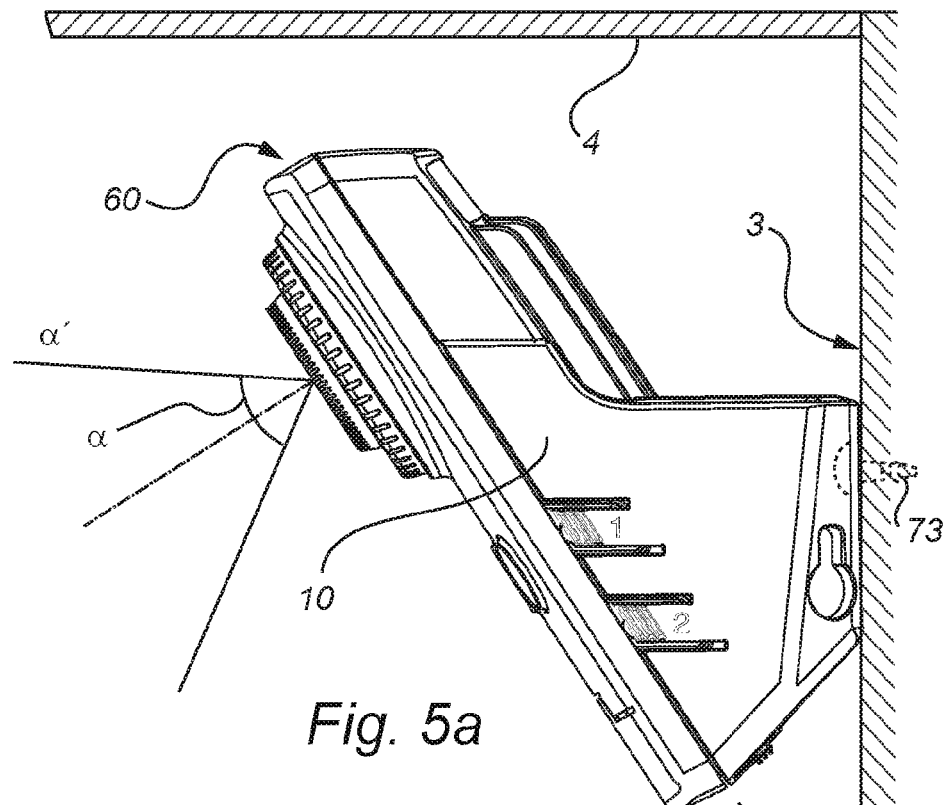
FIG. 5a is a side view of the camera and the mounting bracket of FIG. 1 in an assembled state and with the camera and mounting bracket mounted on a wall.
Figure 5B:
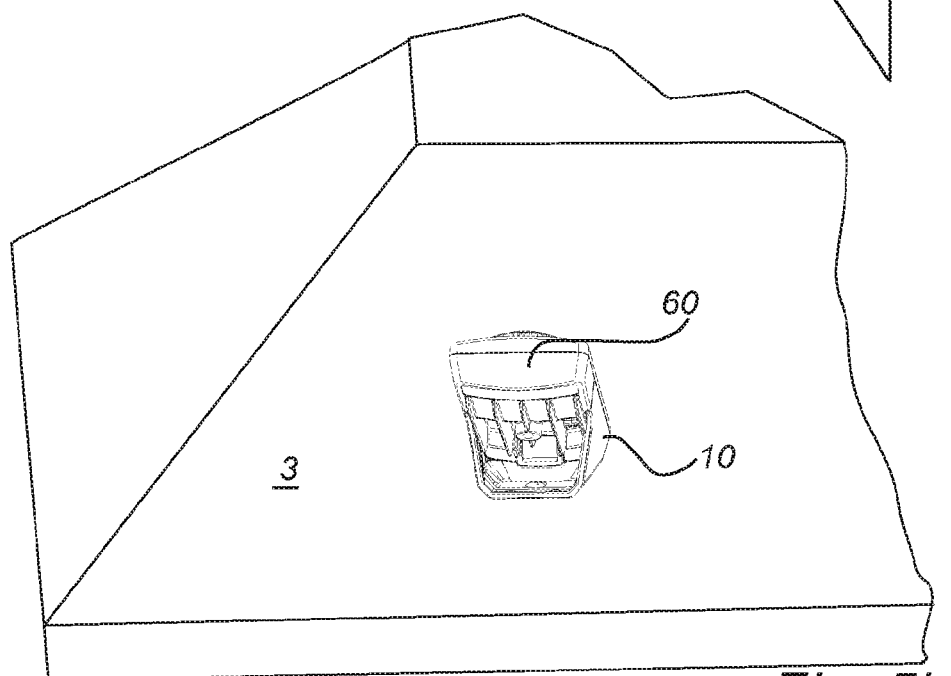
Figure 6A:
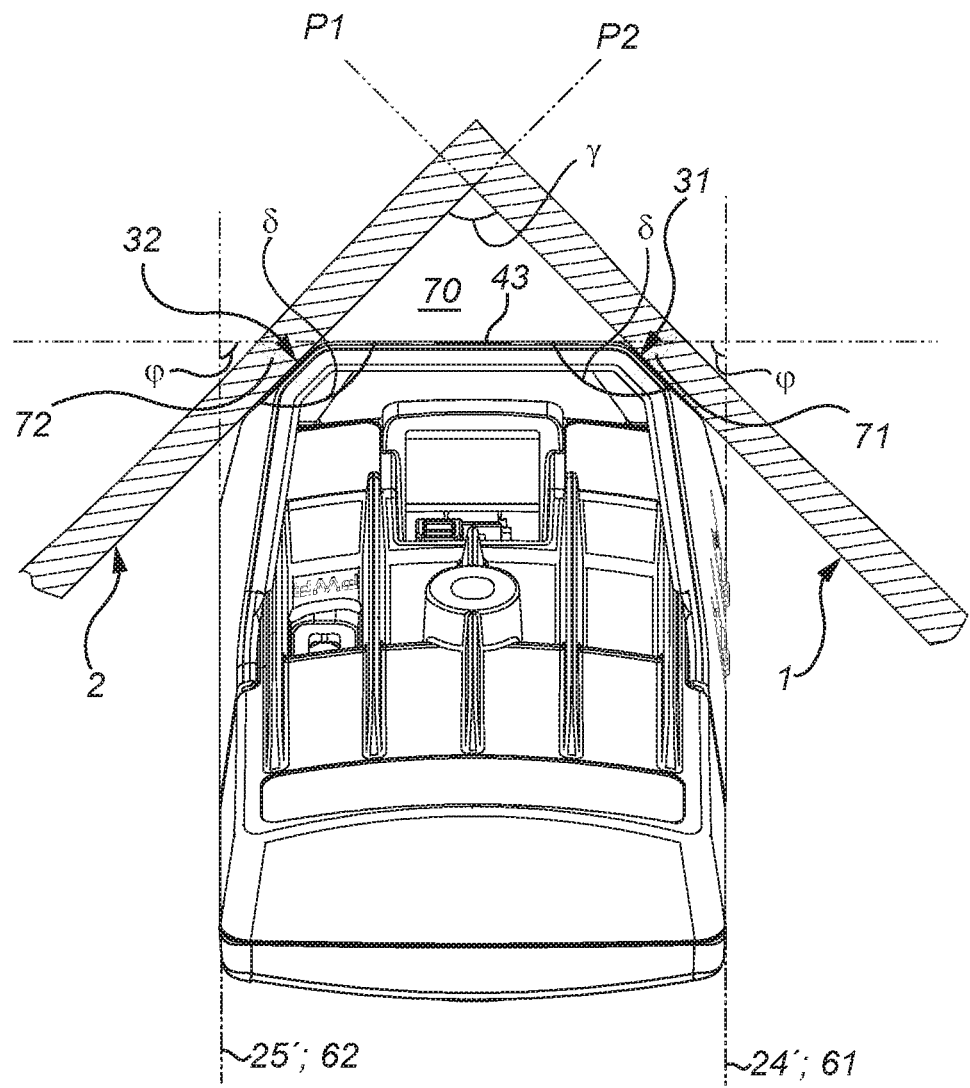
FIG. 6a is a top view of the camera and the mounting bracket of FIG. 1 in an assembled state and with the camera and mounting bracket mounted in a corner.
Figure 6B:
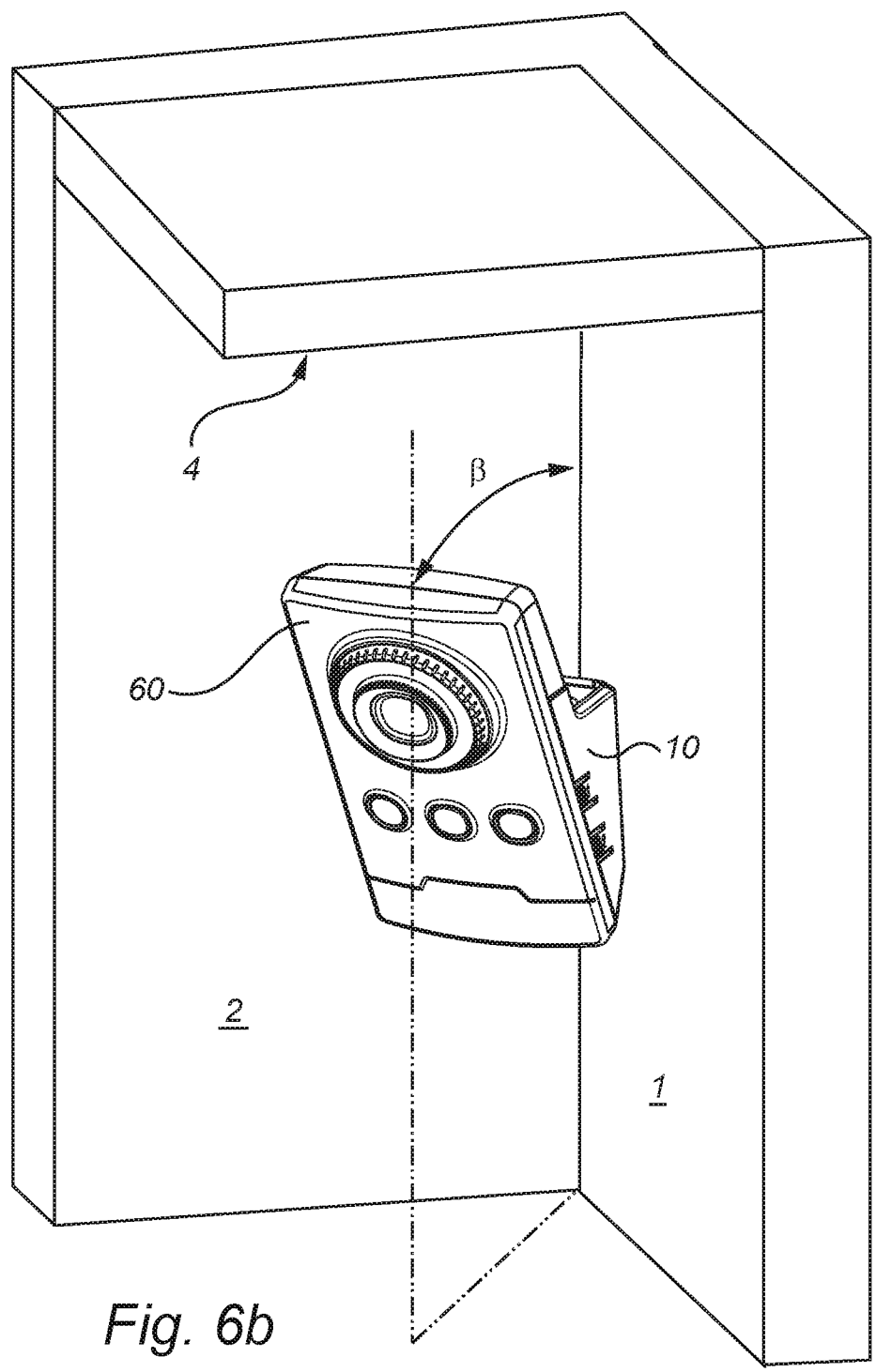

With reference to FIG. 1, there is disclosed a mounting bracket 10 for mounting a monitoring camera 60. As shown in FIGS. 6a-b, the mounting bracket 10 is adapted to allow the monitoring camera 60 to be mounted in a corner formed of a first wall 1 and a second wall 2. As shown in FIGS. 5a-b, the mounting bracket 10 is also adapted to allow the monitoring camera 60 to be mounted on a wall 3.

The mounting bracket 10 comprises an alcove 20 adapted to slidingly receive said monitoring camera 60.

The mounting bracket 10 further comprises a first mounting arrangement 30 adapted to be used if the monitoring camera 60 is intended to be mounted in the corner formed of the first 1 and second 2 walls. The first mounting arrangement comprises a first mounting surface 31 and a second mounting surface 32 arranged at an angle $\gamma$ relative to each other. The first mounting surface 31 extends along a plane P1 and the second mounting surface 32 extends along a plane P2, wherein the two planes P1 and P2 intersect at an angle of about 90°. As shown in FIG. 6a, the first mounting surface 31 is adapted to be attached to and to abut the first wall 1 and the second mounting surface 32 is adapted to be attached to and to abut the second wall 2. As indicated in FIG. 6a, this attachment may be performed using screws 71, 72.

The mounting bracket 10 further comprises a second mounting arrangement 40 adapted to be used if said monitoring camera 60 is intended to be mounted on a wall 3. The second mounting arrangement 40 comprises a third mounting surface 43 adapted to be attached to and to abut the wall 3. As indicated in FIG. 5a, this attachment may be performed using one or more screws 73.

Each of the first mounting surface 31 and the second mounting surface 32 extend at an angle $\delta$ relative to the third mounting surface 43 in a direction intended to extend away from the wall 3 or corner 1, 2 such that, when the mounting bracket 10 is mounted in a corner, the first wall 1, the second wall 2 and the third mounting surface 43 define a prismatic volume 70 with triangular cross-section (this is, e.g., shown in FIG. 6a).

Figure 2:
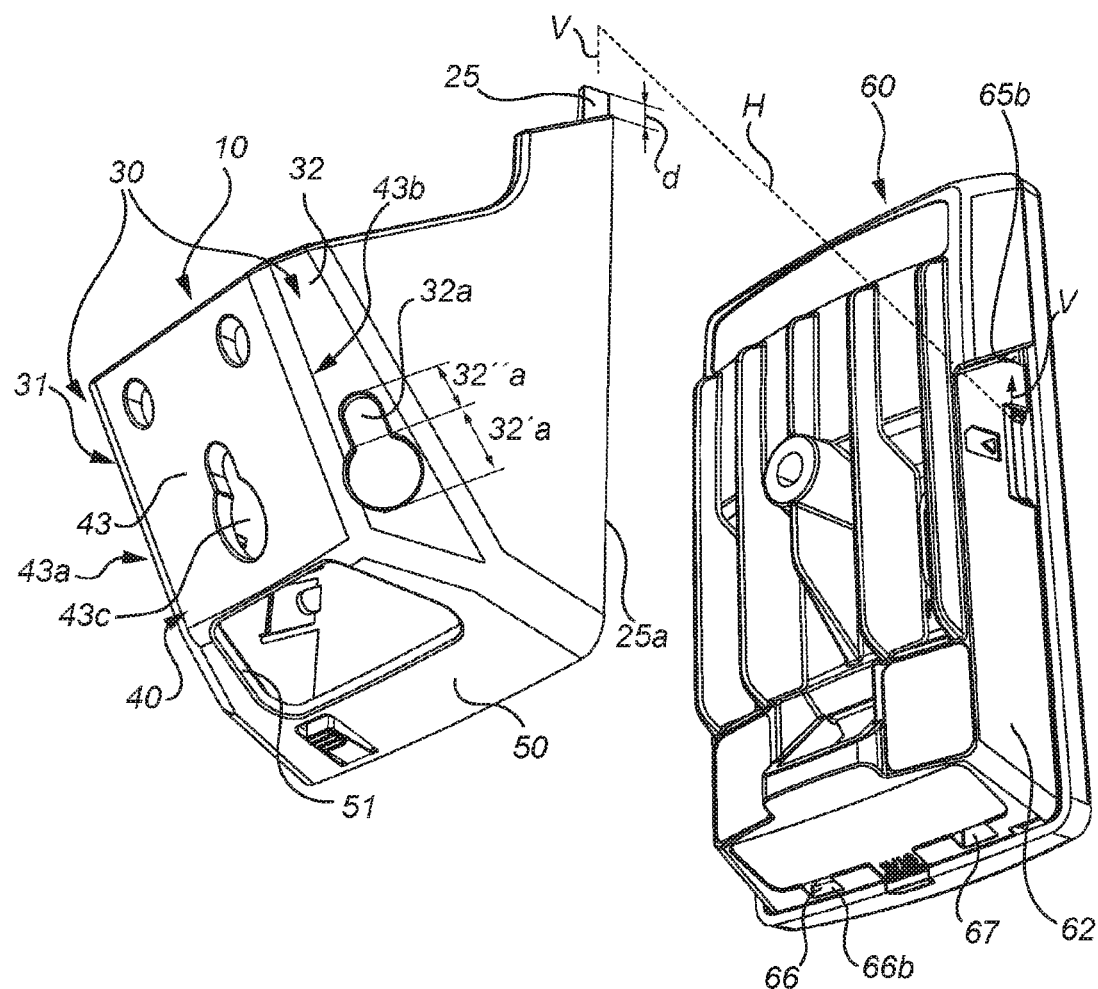
FIG. 2 is a first rear perspective view of the camera and the mounting bracket of FIG. 1 in a non-assembled state.
Figure 3:
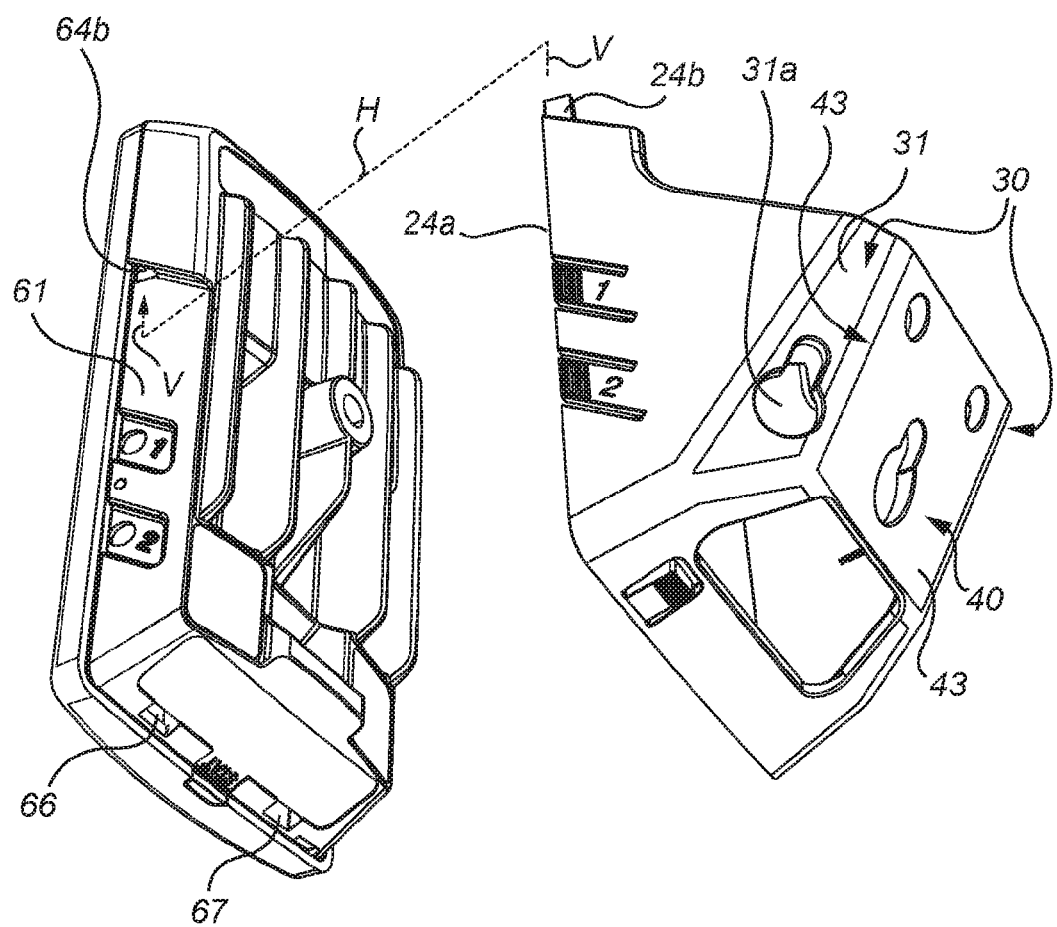
FIG. 3 is a second rear perspective view of the camera and the mounting bracket of FIG. 1 in a non-assembled state.

As shown in FIGS. 2 and 3, the first mounting surface 31 extends along a first side 43a of the third mounting surface 43 and the second mounting surface 32 extends along a second side 43b, opposite the first side 43a, of the third mounting surface 43.

As shown in FIG. 1, the alcove 20 comprises a fourth surface 24 and a fifth surface 25. The fourth and fifth surfaces 24, 25 form two opposing, inwardly facing side surfaces of the alcove 20. The fourth and fifth surfaces 24, 25 each extend from a respective one of the first 31 and second mounting surfaces 32 and at an angle $\phi$ relative to the third mounting surface 43 in a direction intended to extend away from the wall 3 or the corner 1, 2. The two side surfaces 24, 25 of the alcove 20 are adapted to slidingly engage with two opposing, outwardly facing side surfaces 61, 62 of the monitoring camera 60.

The mounting bracket 10 further comprises a bottom wall 50 adjoining the third surface 43, the first 31 and second surfaces 32 and the fourth 24 and fifth 25 surfaces. The bottom wall 50 is provided with a through-going opening 51 for cables and for providing ventilation.

The mounting bracket is designed as a shell with the surfaces arranged one after another forming the shell in the order: the fourth surface 24, the first surface 31, the third surface 43, the second surface 32 and the fifth surface 25. It may be noted that the term surfaces has been used to refer to the surface actually being active or having a function. When it comes to the abutment to the walls 1, 2, 3, it is the surface on the outside or backside of the different portions of the mounting bracket 10 that abuts the walls 1, 2, 3. When comes to the fourth 24 and fifth 25 surfaces of the alcove 20, it is the inside surfaces of those portions that abut the camera 60.

When the mounting bracket 10 is mounted on the wall 3 or in the corner 1, 2, the fourth 24 and fifth 25 surfaces are adapted to each extend in a respective plane 24', 25' having a vertical extension (as shown in FIG. 6a). The fourth 24 and fifth 25 surfaces are parallel to each other. The fourth 24 and fifth 25 surfaces are orthogonal to the third surface 43.

The design of the mounting bracket 10 allows the monitoring camera 60 to be inserted between the fourth 24 and fifth 25 surfaces in a horizontally directed movement H. It should be noted that the horizontal movement need not be completely horizontal. It may, e.g., be noted that the planes 24', 25' of the fourth 24 and fifth 25 surfaces have a vertical extension, but that the free ends 24a, 24b of the surfaces 24, 25 need not be vertically extending. In the embodiment disclosed in the drawings, the free ends 24a, 24b of the surfaces 24, 25 are inclined such that the free ends 24a, 2 face away from the wall 1, 2, 3 and downwardly. The fourth 24 and fifth 25 surfaces are flat, such that they do not prevent horizontal movement of the camera 60. It may also be noted that the monitoring camera 60 is slidable also in a vertical direction between the fourth 24 and fifth 25 surfaces. However, since the fourth 24 and fifth 25 surfaces allow for the camera 60 to be inserted into the alcove 20 in a horizontally directed movement, it is possible to mount the camera 60 close to the ceiling 4.

The fourth 24 and fifth 25 surfaces are each provided with an upper tongue 24b, 25b adapted to extend, when the mounting bracket 10 is mounted on the wall 3 or in the corner 1, 2, upwardly a distance d from the fourth 24 and the fifth 25 surface, respectively. The upper tongues 24b, 25b are adapted to be inserted into and interact with one to each upper tongue 24b, 25b associated downwardly facing upper recess 64b, 65b of the monitoring camera 60. This interaction between the upper tongues 24b, 25b and the upper recesses 64b, 65b is adapted to prevent said monitoring camera 60 from being removed from between the fourth 24 and fifth 25 surfaces in a horizontally H directed movement. By providing the mounting bracket 10 with such upwardly extending upper tongues 24b, 25b the camera 60 may be held in place only using gravity. The provision of such tongues 24b, 25b also provides the possibility to provide a secure positioning of the camera 60 in the alcove 20 and still allowing the camera 60 to be inserted to a large extent along a horizontal direction H.

The mounting bracket 10 is further provided with one or more lower tongues 56, 57 positioned at a bottom portion of the alcove 20. In the disclosed design, there are two lower tongues 56, 57 positioned on the bottom wall 50. The two lower tongues 56, 57 are adapted to extend, when the bracket 10 is mounted on the wall 3 or in the corner 1, 2, upwardly a distance D from the bottom wall 50. The two lower tongues 56, 57 are adapted to be inserted into and interact with one to each at least one lower tongue 56, 57 associated downwardly facing lower recess 66, 67 of said monitoring camera 60.

The interaction between the lower tongues 56, 57 and the lower recesses 66, 67 is adapted to prevent said monitoring camera 60 from being removed from between the fourth 24 and fifth 25 surfaces in a horizontally directed H movement. By providing the mounting bracket 10 with such upwardly extending lower tongues 56, 57, the camera 60 may be held in place using only gravity. The provision of such tongues 56, 57 also provides the possibility to provide a secure positioning of the camera in the alcove and still allowing the camera to be inserted to a large extent along a horizontal direction.

The only vertical movement V necessary is a short distance for allowing the upper and lower upwardly extending tongues 24b, 25b, 56, 57 to pass the portions of the camera 60 surrounding the recesses 64b, 65b, 66, 67 such that the tongues 24b, 25b, 56, 57 become aligned with the recesses 64b, 65b, 66, 67 of the camera 60. The vertical movement V need only be a fraction larger than the largest of the vertical extension d of the upper tongues 24b, 25b and the vertical extension D of the lower tongues 56, 57.

Figure 4:
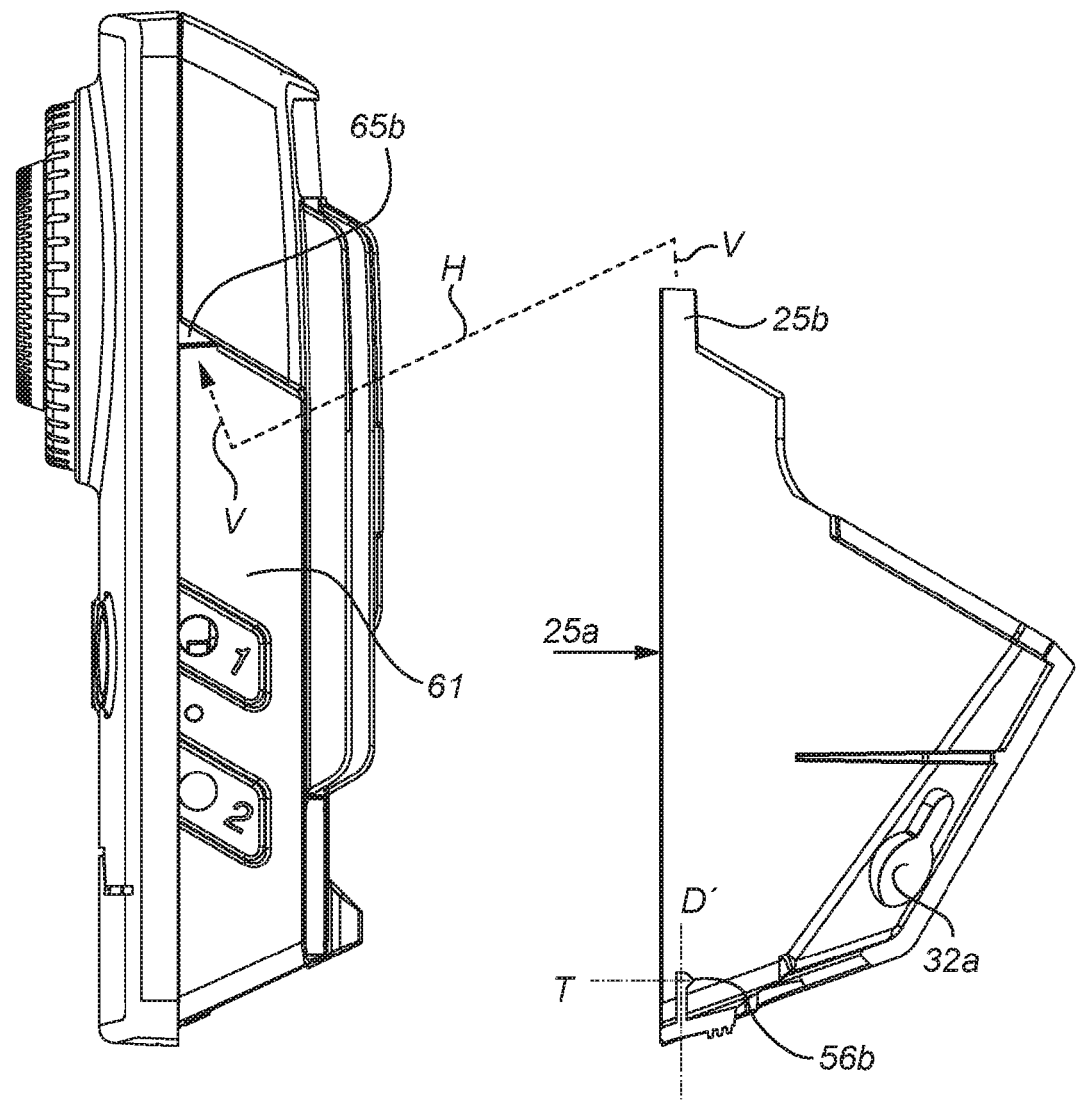
FIG. 4 is a side view of the camera and the mounting bracket of FIG. 1 in a non-assembled state.

In the disclosed design, one of the lower tongues 56 has a main extension along a first direction D' and is provided with a protrusion 56b having an extension in a to the first direction D' transverse direction T (see, e.g., FIG. 4). The lower tongue 56 is resiliently flexible in the transverse direction T, thereby capable of providing a snap-lock action with a transversely oriented edge 66b in the associated lower recess 66. This prevents the monitoring camera 60 from being moved vertically upwardly from the alcove 20 thereby keeping the interaction between the tongues 24b, 25b, 56, 57 and the recesses 64b, 65b, 66, 67 active. This way the camera 60 is securely held in place in the alcove 20. Moreover, the snap-lock may provide the installer with feedback concerning that the camera 60 is correctly positioned in the alcove 20.

In the disclosed design, the wall member forming the first surface 31 and a second wall member forming the second surface 32 are each provided with one or more through-going openings 31a, 32a. When the mounting bracket 10 is intended to be mounted in a corner 1, 2, a fastener 71 is adapted to extend through the through-going opening 31a in the first wall member to attach the bracket 10 with the first surface 31 in abutment to the first wall 1 and a fastener 72 is adapted to extend through the through-going opening 32a in the second wall member to attach the bracket 10 with the second surface 32 in abutment to the second wall 2.

Similarly, a third wall member forming the third surface 43 is provided with a through-going opening 43c, wherein when the bracket 10 is intended to be mounted on a wall 3, a fastener 73 is adapted to extend through the through-going opening 43c to attach the bracket 10 with the third surface 43 in abutment to the wall 3.

The openings may be circular and the fasteners, such as a screw, may be inserted through the openings as the bracket is held in place on the wall. The openings may be designed such that the fasteners are held in place by the walls of the opening such that the installer only needs to hold the bracket. In the disclosed embodiment the openings are key-hole shaped. With reference to FIG. 2, this key-hole shape is explained in respect of opening 32a. The opening 32a has a lower large portion 32'a being larger than the head of the fastener 72 and an upper narrower portion 32"a being smaller than the head of the fastener 72. In the preferred embodiment, the openings 31a, 32a, and 43c have such a key-hole shape.

In the disclosed design the fourth wall member forming the fourth surface 24 is provided with two resiliently depressible portions 24c, 24d adapted to interact with one or more associated depressible buttons 64c, 64d on said monitoring camera 60, thereby allowing said one or more buttons 64c, 64d to be operated although hidden inside the alcove 20 of the mounting bracket 10.

The alcove 20 is adapted to receive the monitoring camera 60 in a fixed mounting position, and the first 30 and second 40 mounting arrangements are inclined relative to the alcove 20 such that there is, in a vertical plane, provided a fixed mounting angle $\beta$ in relation to the wall 3 or the corner 1, 2, wherein the camera 60 is adapted to, in said mounting position, be inclined relative to the wall 3 or corner 1, 2 with its field of view oriented away from the wall 1, 2, 3 and inclined downwardly. The fixed mounting angle $\beta$ in relation to the wall makes it possible to ensure that the camera is mounted with the upper limit $\alpha'$ of the vertical view angle $\alpha$ parallel to the ceiling 4 (see FIG. 5a). The vertical plane in which the angles $\alpha$ and $\beta$ is measured is in the wall mount orthogonal to the wall 3. The vertical plane in which the angles $\alpha$ and $\beta$ is measured is in the corner mount bisecting the corner as indicated in FIG. 6b. By this arrangement, it is easy to ensure that the camera is not blinded by light from lamps mounted in the ceiling 4.

It is contemplated that there are numerous modifications of the embodiments described herein, which are still within the scope of the invention as defined by the appended claims.

It may be noted that the use of screws for attaching the mounting bracket is an example. There are other means of attaching the mounting bracket to the wall or walls.

The mounting bracket may according to one alternative be attached using an adhesive, such as an adhesive tape. The tape may be provided between the first surface and the first wall and/or between the second surface and the second wall when the mounting bracket is installed in a corner. The tape may be provided between the third surface and the wall when the mounting bracket is installed on a wall.

Strips of adhesive tape may, e.g., be pre-adhered to the surfaces of the mounting bracket and may during transport be protected with a protective non-adhesive strip. At the installation site, the installer simply removes the protective strips on the surfaces intended to be attached to the walls thereby exposing the adhesive tape on the intended surfaces. The mounting bracket is then pushed into place on the wall or in the corner such that the exposed adhesive strips attach to the wall or walls.

It should be noted that the fourth and fifth surfaces need not be strictly parallel to each other. In one alternative their respective free ends are slightly inclined towards each other and they are in such a case preferably resiliently flexible thereby allowing said monitoring camera to be inserted between the fourth and fifth surfaces in a horizontally directed movement and the resilience is used to securely hold the camera in place in the alcove.

In the disclosed design the fourth wall member forming the fourth surface 24 is provided with resiliently depressible portions. As an alternative or complement thereto the fifth wall member forming the fifth surface may comprise one or more resiliently depressible portions adapted to interact with one or more associated depressible button on said monitoring camera, thereby allowing said one or more buttons to be operated although hidden inside the alcove of the mounting bracket. Also the number of resiliently depressible portions may be different than the disclosed two. Also the number of resiliently depressible portions may be different on different sides of the bracket.

The mounting bracket 10 may be made from any suitable material. It may be made of plastic, e.g., by injection moulding, or of metal, e.g., by bending sheet metal.

The invention claimed is:

1. A mounting bracket for mounting a monitoring camera, the mounting bracket comprising
    an alcove adapted to slidingly receive said monitoring camera,
    a first mounting arrangement adapted to be used when the monitoring camera is mounted in a corner formed of a first and a second wall, the first mounting arrangement comprising a first and a second mounting surface arranged at an angle relative to each other, wherein the first mounting surface is adapted to be attached to and to abut the first wall and wherein the second mounting surface is adapted to be attached to and to abut the second wall, and
    a second mounting arrangement adapted to be used when said monitoring camera is mounted on a wall, the second mounting arrangement comprising a third mounting surface adapted to be attached to and to abut the wall,
    wherein the alcove comprises a fourth surface and a fifth surface, the fourth and fifth surfaces forming two opposing, inwardly facing side surfaces, each extending from a respective one of the first and second mounting surfaces and at an angle relative to the third mounting surface in a direction extending away from the wall or the corner, wherein the two side surfaces of the alcove are adapted to slidingly engage with two opposing, outwardly facing side surfaces of the monitoring camera,
    wherein the fourth and fifth surfaces are each provided with an upper tongue adapted to extend, when the mounting bracket is mounted on the wall or in the corner, upwardly from the fourth and the fifth surface, respectively, and to be inserted into and interact with one to each upper tongue associated downwardly facing upper recess of said monitoring camera, the interaction between the upper tongues and upper recesses being adapted to prevent said monitoring camera from being removed from between the fourth and fifth surfaces in a horizontally directed movement, and
    wherein the mounting bracket is further provided with at least one lower tongue which is positioned at a bottom portion of the alcove and which is adapted to extend, when the mounting bracket is mounted on the wall or in the corner, upwardly from the bottom portion and to be inserted into and interact with one to each at least one lower tongue associated downwardly facing lower recess of said monitoring camera, the interaction between the lower tongue and the lower recess being adapted to prevent said monitoring camera from being removed from between the fourth and fifth surfaces in a horizontally directed movement.

2. The mounting bracket according to claim 1, wherein each of the first mounting surface and the second mounting surface extend at an angle relative to the third mounting surface in a direction extending away from the wall or corner such that, when the mounting bracket is mounted at a corner, the first wall, the second wall and the third mounting surface define a prismatic volume with triangular cross-section.

3. The mounting bracket according to claim 1, wherein the first mounting surface extends along a first side of the third mounting surface and the second mounting surface extends along a second side, opposite the first side, of the third mounting surface.

4. The mounting bracket according to claim 1, wherein, when the mounting bracket is mounted on the wall or in the corner, the fourth and fifth surfaces are adapted to each extend in a respective plane having a vertical extension, and wherein the fourth and fifth surfaces are parallel to each other.

5. The mounting bracket according to claim 1, the bracket further comprising a bottom wall adjoining the third surface, the first and second surfaces and the fourth and fifth surfaces.

6. The mounting bracket according to claim 5, wherein the bottom wall is provided with a through-going opening.

7. The mounting bracket according to claim 1, wherein a first wall member forming the first surface and a second wall member forming the second surface are each provided with one or more through-going openings, wherein when the bracket is mounted in a corner, one or more fasteners are adapted to extend through said one or more through-going openings in the first wall member to attach the mounting bracket with the first surface in abutment to the first wall and one or more fasteners are adapted to extend through said one or more through-going openings in the second wall member to attach the mounting bracket with the second surface in abutment to the second wall.

8. The mounting bracket according to claim 1, wherein a third wall member forming the third surface is provided with one or more through-going openings, wherein when the mounting bracket is mounted on a wall, one or more fasteners are adapted to extend through said one or more through-going openings to attach the mounting bracket with the third surface in abutment to the wall.

9. The mounting bracket according to claim 1, wherein a fourth wall member forming the fourth surface or a fifth wall member forming the fifth surface comprises one or more resiliently depressible portions adapted to interact with one or more associated depressible button on said monitoring camera, thereby allowing said one or more buttons to be operated although hidden inside the alcove of the mounting bracket.

10. The mounting bracket according to claim 1, wherein the alcove is adapted to receive a monitoring camera in a fixed mounting position and wherein the first and second mounting arrangements are inclined relative to the alcove such that there is provided a fixed mounting angle in relation to the wall or the corner, wherein the camera is adapted to in said mounting position be inclined relative to the wall or corner with its field of view oriented away from the wall or corner and inclined downwardly.

11. System comprising a mounting bracket according to claim 1 and a monitoring camera with an outer envelope being adapted to be slidingly received in the alcove of the mounting bracket.

12. A mounting bracket for mounting a monitoring camera, the mounting bracket comprising
an alcove adapted to slidingly receive said monitoring camera,
a first mounting arrangement adapted to be used when the monitoring camera is mounted in a corner formed of a first and a second wall, the first mounting arrangement comprising a first and a second mounting surface arranged at an angle relative to each other, wherein the first mounting surface is adapted to be attached to and to abut the first wall and wherein the second mounting surface is adapted to be attached to and to abut the second wall, and
a second mounting arrangement adapted to be used when said monitoring camera is mounted on a wall, the second mounting arrangement comprising a third mounting surface adapted to be attached to and to abut the wall,
wherein the alcove comprises a fourth surface and a fifth surface, the fourth and fifth surfaces forming two opposing, inwardly facing side surfaces, each extending from a respective one of the first and second mounting surfaces and at an angle relative to the third mounting surface in a direction extending away from the wall or the corner, wherein the two side surfaces of the alcove are adapted to slidingly engage with two opposing, outwardly facing side surfaces of the monitoring camera, and
wherein the fourth and fifth surfaces are each provided with an upper tongue adapted to extend, when the mounting bracket is mounted on the wall or in the corner, upwardly from the fourth and the fifth surface, respectively, and to be inserted into and interact with one to each upper tongue associated downwardly facing upper recess of said monitoring camera, the interaction between the upper tongues and upper recesses being adapted to prevent said monitoring camera from being removed from between the fourth and fifth surfaces in a horizontally directed movement.

13. The mounting bracket according to claim 12, wherein each of the first mounting surface and the second mounting surface extend at an angle relative to the third mounting surface in a direction extending away from the wall or corner such that, when the mounting bracket is mounted at a corner, the first wall, the second wall and the third mounting surface define a prismatic volume with triangular cross-section.

14. The mounting bracket according to claim 12, wherein the first mounting surface extends along a first side of the third mounting surface and the second mounting surface extends along a second side, opposite the first side, of the third mounting surface.

15. The mounting bracket according to claim 12, wherein, when the mounting bracket is mounted on the wall or in the corner, the fourth and fifth surfaces are adapted to each extend in a respective plane having a vertical extension, and wherein the fourth and fifth surfaces are parallel to each other.

16. The mounting bracket according to claim 12,
wherein the mounting bracket is further provided with at least one lower tongue which is positioned at a bottom portion of the alcove and which is adapted to extend, when the mounting bracket is mounted on the wall or in the corner, upwardly from the bottom portion and to be inserted into and interact with one to each at least one lower tongue associated downwardly facing lower recess of said monitoring camera, the interaction between the lower tongue and the lower recess being adapted to prevent said monitoring camera from being removed from between the fourth and fifth surfaces in a horizontally directed movement, and
wherein the lower tongue has a main extension along a first direction and is provided with a protrusion having an extension in a direction being transverse to the first direction, and wherein the lower tongue is resiliently flexible in the transverse direction, thereby capable of providing a snap-lock action with a transversely oriented edge in the lower recess of said monitoring camera preventing the monitoring camera from being moved vertically upwardly from the alcove.

17. The mounting bracket according to claim 12, the bracket further comprising a bottom wall adjoining the third surface, the first and second surfaces and the fourth and fifth surfaces.

18. The mounting bracket according to claim 17, wherein the bottom wall is provided with a through-going opening.

19. The mounting bracket according to claim 12, wherein a first wall member forming the first mounting surface and a second wall member forming the second surface are each provided with one or more through-going openings, wherein when the bracket is mounted in a corner, one or more fasteners are adapted to extend through said one or more through-going openings in the first wall member to attach the mounting bracket with the first mounting surface in abutment to the first wall and one or more fasteners are adapted to extend through said one or more through-going openings in the second wall member to attach the mounting bracket with the second surface in abutment to the second wall.

20. The mounting bracket according to claim 12, wherein a third wall member forming the third surface is provided with one or more through-going openings, wherein when the mounting bracket is mounted on a wall, one or more fasteners are adapted to extend through said one or more through-going openings to attach the mounting bracket with the third surface in abutment to the wall.

21. The mounting bracket according to claim 12, wherein a fourth wall member forming the fourth surface or a fifth wall member forming the fifth surface comprises one or more resiliently depressible portions adapted to interact with one or more associated depressible button on said monitoring camera, thereby allowing said one or more buttons to be operated although hidden inside the alcove of the mounting bracket.

22. The mounting bracket according to claim 12, wherein the alcove is adapted to receive a monitoring camera in a fixed mounting position and wherein the first and second mounting arrangements are inclined relative to the alcove such that there is provided a fixed mounting angle in relation to the wall or the corner, wherein the camera is adapted to in said mounting position be inclined relative to the wall or corner with its field of view oriented away from the wall or corner and inclined downwardly.

23. System comprising a mounting bracket according to claim 12 and a monitoring camera with an outer envelope being adapted to be slidingly received in the alcove of the mounting bracket.

24. A mounting bracket for mounting a monitoring camera, the mounting bracket comprising
  an alcove adapted to slidingly receive said monitoring camera,
  a first mounting arrangement adapted to be used when the monitoring camera is mounted in a corner formed of a first and a second wall, the first mounting arrangement comprising a first and a second mounting surface arranged at an angle relative to each other, wherein the first mounting surface is adapted to be attached to and to abut the first wall and wherein the second mounting surface is adapted to be attached to and to abut the second wall, and
  a second mounting arrangement adapted to be used when said monitoring camera is mounted on a wall, the second mounting arrangement comprising a third mounting surface adapted to be attached to and to abut the wall,
  wherein the alcove comprises a fourth surface and a fifth surface, the fourth and fifth surfaces forming two opposing, inwardly facing side surfaces, each extending from a respective one of the first and second mounting surfaces and at an angle relative to the third mounting surface in a direction extending away from the wall or the corner, wherein the two side surfaces of the alcove are adapted to slidingly engage with two opposing, outwardly facing side surfaces of the monitoring camera, and
  wherein the mounting bracket is further provided with at least one lower tongue which is positioned at a bottom portion of the alcove and which is adapted to extend, when the mounting bracket is mounted on the wall or in the corner, upwardly from the bottom portion and to be inserted into and interact with one to each at least one lower tongue associated downwardly facing lower recess of said monitoring camera, the interaction between the lower tongue and the lower recess being adapted to prevent said monitoring camera from being removed from between the fourth and fifth surfaces in a horizontally directed movement.

25. The mounting bracket according to claim 24, wherein each of the first mounting surface and the second mounting surface extend at an angle relative to the third mounting surface in a direction extending away from the wall or corner such that, when the mounting bracket is mounted at a corner, the first wall, the second wall and the third mounting surface define a prismatic volume with triangular cross-section.

26. The mounting bracket according to claim 24, wherein the first mounting surface extends along a first side of the third mounting surface and the second mounting surface extends along a second side, opposite the first side, of the third mounting surface.

27. The mounting bracket according to claim 24, wherein, when the mounting bracket is mounted on the wall or in the corner, the fourth and fifth surfaces are adapted to each extend in a respective plane having a vertical extension, and wherein the fourth and fifth surfaces are parallel to each other.

28. The mounting bracket according to claim 24, wherein the lower tongue has a main extension along a first direction and is provided with a protrusion having an extension in a direction being transverse to the first direction, and wherein the lower tongue is resiliently flexible in the transverse direction, thereby capable of providing a snap-lock action with a transversely oriented edge in the lower recess of said monitoring camera preventing the monitoring camera from being moved vertically upwardly from the alcove.

29. The mounting bracket according to claim 24, the bracket further comprising a bottom wall adjoining the third surface, the first and second surfaces and the fourth and fifth surfaces.

30. The mounting bracket according to claim 29, wherein the bottom wall is provided with a through-going opening.

31. The mounting bracket according to claim 24, wherein a first wall member forming the first mounting surface and a second wall member forming the second surface are each provided with one or more through-going openings, wherein when the bracket is mounted in a corner, one or more fasteners are adapted to extend through said one or more through-going openings in the first wall member to attach the mounting bracket with the first mounting surface in abutment to the first wall and one or more fasteners are adapted to extend through said one or more through-going openings in the second wall member to attach the mounting bracket with the second surface in abutment to the second wall.

32. The mounting bracket according to claim 24, wherein a third wall member forming the third surface is provided with one or more through-going openings, wherein when the mounting bracket is mounted on a wall, one or more fasteners are adapted to extend through said one or more through-going openings to attach the mounting bracket with the third surface in abutment to the wall.

33. The mounting bracket according to claim 24, wherein a fourth wall member forming the fourth surface or a fifth wall member forming the fifth surface comprises one or more resiliently depressible portions adapted to interact with one or more associated depressible button on said monitoring camera, thereby allowing said one or more buttons to be operated although hidden inside the alcove of the mounting bracket.

34. The mounting bracket according to claim 24, wherein the alcove is adapted to receive a monitoring camera in a fixed mounting position and wherein the first and second mounting arrangements are inclined relative to the alcove such that there is provided a fixed mounting angle in relation to the wall or the corner, wherein the camera is adapted to in said mounting position be inclined relative to the wall or corner with its field of view oriented away from the wall or corner and inclined downwardly.

35. System comprising a mounting bracket according to claim 24 and a monitoring camera with an outer envelope being adapted to be slidingly received in the alcove of the mounting bracket.

* * * * *